(12) United States Patent
Tejero Embuena et al.

(10) Patent No.: US 11,408,306 B2
(45) Date of Patent: Aug. 9, 2022

(54) NACELLE FOR GAS TURBINE ENGINE AND AIRCRAFT COMPRISING THE SAME

(71) Applicant: ROLLS-ROYCE plc, London (GB)

(72) Inventors: Fernando L Tejero Embuena, Nottingham (GB); David G. Macmanus, Olney (GB); Christopher T J Sheaf, Derby (GB)

(73) Assignee: Rolls-Royce PLC, London (GB)

( * ) Notice: Subject to any disclaimer, the term of this patent is extended or adjusted under 35 U.S.C. 154(b) by 26 days.

(21) Appl. No.: 17/152,075

(22) Filed: Jan. 19, 2021

(65) Prior Publication Data
US 2021/0254507 A1    Aug. 19, 2021

(30) Foreign Application Priority Data

Feb. 13, 2020 (GB) ..................... 2001971

(51) Int. Cl.
*F01D 25/24* (2006.01)
*B64D 27/12* (2006.01)
*F02C 7/04* (2006.01)

(52) U.S. Cl.
CPC ............. *F01D 25/24* (2013.01); *B64D 27/12* (2013.01); *F02C 7/04* (2013.01); *F05D 2220/323* (2013.01); *F05D 2240/14* (2013.01)

(58) Field of Classification Search
CPC ........... F01D 25/24; F02C 7/04; B64D 27/12; B64D 29/02; B64D 33/02; F05D 2220/323; F05D 2240/14; F05D 2250/38; Y02T 50/60
See application file for complete search history.

(56) References Cited

U.S. PATENT DOCUMENTS

| 3,806,067 | A | 4/1974 | Kutney | |
|---|---|---|---|---|
| 4,722,357 | A * | 2/1988 | Wynosky | .................. F02C 7/04 137/15.1 |
| 5,369,954 | A | 12/1994 | Stuart | |
| 9,815,560 | B2 * | 11/2017 | Marrinan | .................. B64C 1/16 |
| 2008/0105781 | A1 | 5/2008 | Belleville | |

(Continued)

FOREIGN PATENT DOCUMENTS

| EP | 3144218 A1 | 3/2017 |
|---|---|---|
| EP | 3581498 A1 | 12/2019 |

(Continued)

OTHER PUBLICATIONS

European search report dated Jan. 19, 2021, issued in EP Patent Application No. 21151249.

(Continued)

*Primary Examiner* — Igor Kershteyn (57) ABSTRACT

A nacelle for housing a fan within a gas turbine engine having a longitudinal centre line includes a leading edge and a trailing edge. A nacelle length ($L_{nac}$) is defined as an axial distance between the leading edge and the trailing edge. An azimuthal angle (θ) is defined about the longitudinal centre line. The nacelle length ($L_{nac}$) varies azimuthally. The nacelle length ($L_{nac}$) decreases azimuthally from an inboard end of the nacelle to an outboard end of the nacelle.

10 Claims, 5 Drawing Sheets

(56) References Cited

U.S. PATENT DOCUMENTS

| | | | |
|---|---|---|---|
| 2011/0220217 A1 | 9/2011 | Bensilum | |
| 2014/0212279 A1* | 7/2014 | Boudebiza | B64D 29/00 |
| | | | 415/176 |
| 2014/0367510 A1 | 12/2014 | Viala et al. | |
| 2015/0285144 A1* | 10/2015 | Todorovic | F01D 25/243 |
| | | | 137/15.1 |
| 2015/0330254 A1 | 11/2015 | Weiner et al. | |
| 2016/0214727 A1* | 7/2016 | Hamel | B64D 27/24 |
| 2017/0081037 A1* | 3/2017 | Marrinan | B64D 33/02 |
| 2017/0217596 A1 | 8/2017 | Bacon et al. | |
| 2019/0100322 A1 | 4/2019 | Schank | |
| 2019/0382122 A1* | 12/2019 | Sheaf | B64D 33/02 |
| 2019/0383215 A1* | 12/2019 | Sheaf | B64D 33/02 |

FOREIGN PATENT DOCUMENTS

| | | |
|---|---|---|
| EP | 3581499 A1 | 12/2019 |
| FR | 3012417 A1 | 5/2015 |
| GB | 2064005 A | 6/1981 |
| GB | 2238082 A | 5/1991 |

OTHER PUBLICATIONS

Great Britain search report dated Jun. 24, 2020, issued in GB Patent Application No. 2001971.7.

* cited by examiner

NACELLE FOR GAS TURBINE ENGINE AND AIRCRAFT COMPRISING THE SAME

CROSS-REFERENCE TO RELATED APPLICATIONS

This specification is based upon and claims the benefit of priority from UK Patent Application Number GB2001971.7 filed on 13 Feb. 2020, the entire contents of which are incorporated herein by reference.

BACKGROUND

Technical Field

The present disclosure relates to a nacelle, and in particular to a nacelle for a gas turbine engine and an aircraft comprising the nacelle, as set out in the appended claims.

Description of the Related Art

A nacelle for a gas turbine engine is generally symmetric about an intermediate plane. A gas turbine engine may be installed on an aircraft at a region where a wing and a fuselage influence local aerodynamics. Aerodynamic interaction between the nacelle, the wing and the fuselage may introduce non-uniformities in a local air flow field. Influence of the wing and the fuselage on the local air flow field may decrease aerodynamic performance of the nacelle, thereby adversely impacting overall aircraft performance and fuel consumption during operation of an aircraft.

SUMMARY

In a first aspect, there is provided a nacelle for housing a fan within a gas turbine engine having a longitudinal centre line. The nacelle includes a leading edge and a trailing edge. The nacelle further includes a nacelle length defined as an axial distance between the leading edge and the trailing edge. An azimuthal angle is defined about the longitudinal centre line. The nacelle length varies azimuthally as a function of the azimuthal angle. The nacelle length decreases azimuthally from an inboard end of the nacelle to an outboard end of the nacelle.

The azimuthal variation of the nacelle length may result in an asymmetric design of the nacelle. The asymmetric design may improve aerodynamic performance of the nacelle.

In some embodiments, the nacelle length has a maximum value at the inboard end of the nacelle.

In some embodiments, the nacelle length has a minimum value at the outboard end of the nacelle.

The nacelle with an extended inboard end length may reduce an isentropic Mach number at a nacelle and wing intersection point, thereby reducing an aerodynamic interaction between the nacelle and the wing. This may improve overall aircraft performance and reduce fuel consumption during operation of an aircraft.

In some embodiments, the nacelle further includes an intermediate plane defined between the leading edge and the trailing edge. The intermediate plane is substantially normal to the longitudinal centre line and includes a maximum radius of an outer surface of the nacelle with respect to the longitudinal centre line. The radius of the outer surface in the intermediate plane varies azimuthally. The radius of the outer surface in the intermediate plane can vary as a function of the azimuthal angle.

The azimuthal variation of the radius of the nacelle may decrease a nacelle to fuselage distance. The nacelle to fuselage distance may have a first order impact on an aerodynamic interaction between the nacelle and the fuselage for certain engine configurations, such as a close-coupled ultra-high bypass ratio (UHBPR) engine. Due to the reduction of the nacelle to fuselage distance, the aerodynamic interaction between the nacelle and the fuselage may be reduced. This may optimise aerodynamic performance of the nacelle, and subsequently improve overall aircraft performance and reduce fuel consumption.

Furthermore, the azimuthal variation of the radius of the nacelle may also result in a reduction in a gully length. The gully length may have a first order impact on the aerodynamic interaction between the nacelle and the wing for certain engine configurations, such as a close-coupled ultra-high bypass ratio (UHBPR) engine. The reduction in the gully length may further optimise aerodynamic performance of the nacelle, and subsequently improve overall aircraft performance and reduce fuel consumption.

In some embodiments, the nacelle further includes a fan casing disposed downstream of the leading edge. The intermediate plane axially bisects the fan casing.

In some embodiments, a highlight radius is defined at the leading edge of the nacelle. A ratio of the nacelle length to the highlight radius is greater than 2.4 and less than 3.6.

In a second aspect there is provided a gas turbine engine for an aircraft. The gas turbine engine includes the nacelle of the first aspect. The gas turbine engine further includes a fan received within the nacelle. The gas turbine engine further incudes an engine core received within the nacelle.

In a third aspect there is provided an aircraft including the gas turbine engine of the second aspect. The aircraft further includes a fuselage. The aircraft further includes at least one wing extending from the fuselage. The nacelle is attached to the at least one wing.

A nacelle to fuselage distance of the aircraft may be reduced. The nacelle to fuselage distance may have a first order impact on an aerodynamic interaction between the nacelle and the fuselage for a close-coupled ultra-high bypass ratio (UHBPR) engine. This may optimise aerodynamic performance of the nacelle and subsequently improve overall aircraft performance and reduce fuel consumption.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

It should be noted that in the context of this disclosure, the nacelle is a nacelle suitable for housing a fan within a gas turbine engine. The fan in this case is a propulsive fan, i.e. the fan within the engine that generates a large percentage of the propulsive thrust of the engine.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
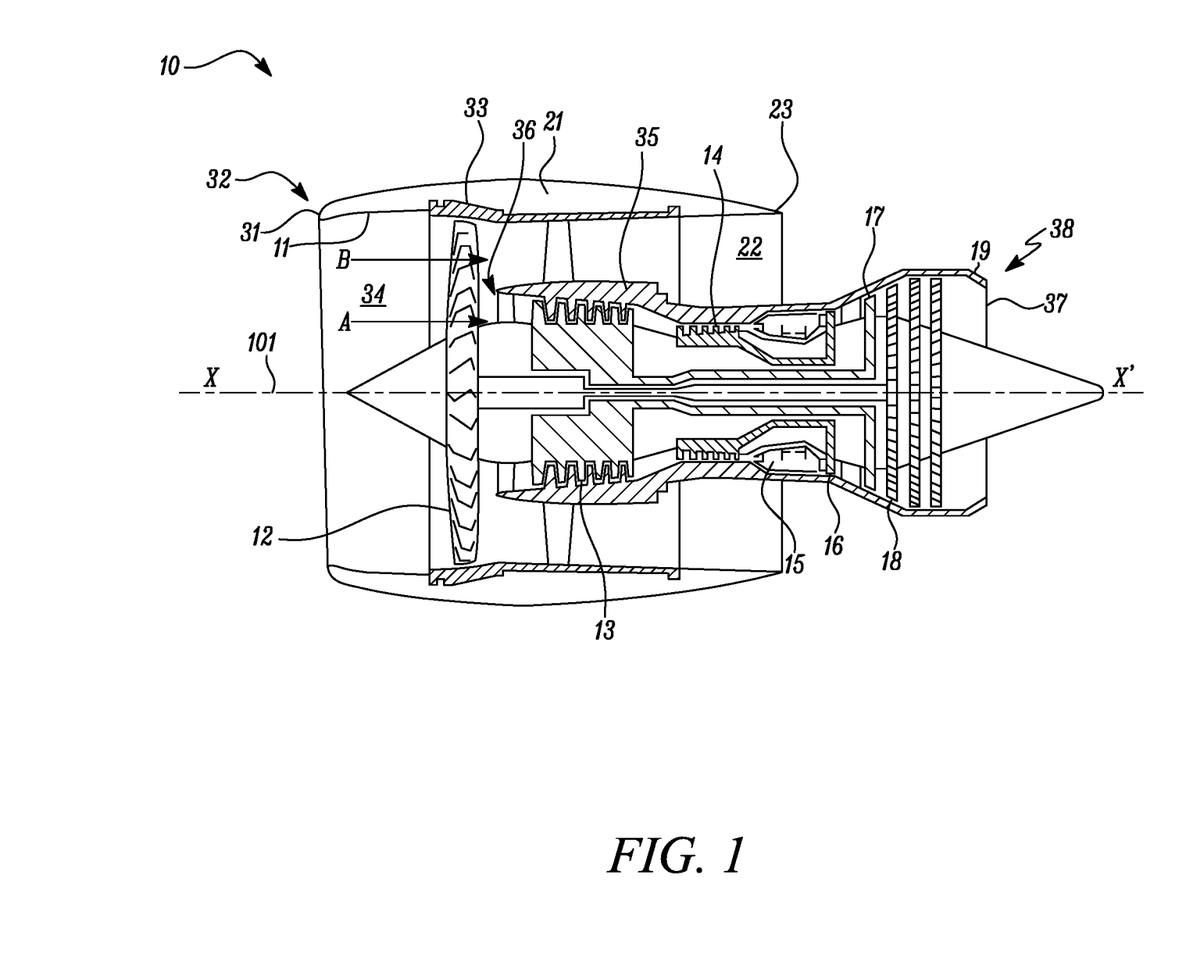
FIG. 1 is a sectional side view of a gas turbine engine.

FIG. 1 shows a ducted fan gas turbine engine 10 having a principal rotational axis X-X'. The principal rotational axis X-X' coincides with a longitudinal centre line 101 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X' of the gas turbine engine 10.

The gas turbine engine 10 includes, in axial flow series, an intake 11, a fan 12, an intermediate pressure compressor 13, a high pressure compressor 14, combustion equipment 15, a high pressure turbine 16, an intermediate pressure turbine 17, a low pressure turbine 18 and an engine core exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. As such, fan 12 is a propulsive fan, in that it generates a large percentage of the propulsive thrust of the engine. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate and low pressure turbines 16, 17, 18 before being exhausted through the engine core exhaust nozzle 19 to provide additional propulsive thrust. The high, intermediate and low pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio (UHBPR) engine.

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. An engine core 36 of the gas turbine engine 10 including the intermediate pressure compressor 13, the high pressure compressor 14, the combustion equipment 15, the high pressure turbine 16, the intermediate pressure turbine 17, the low pressure turbine 18 and the engine core exhaust nozzle 19 is received within the nacelle 21. Specifically, the engine core 36 is received within the engine casing 35. The nacelle 21 further includes an exhaust 37 disposed at a downstream end 38 of the nacelle 21. The exhaust 37 may be a part of the engine casing 35. The exhaust 37 may at least partly define the engine core exhaust nozzle 19.

The nacelle 21 for the gas turbine engine 10 may be typically designed by manipulating a plurality of nacelle parameters. The nacelle parameters may be dependent on the type of engine the nacelle 21 surrounds, as well as considerations for integration of engine ancillaries, such as a thrust reversal unit (TRU).

Presently, conventional nacelles are generally mirrored to be symmetric about an intermediate plane, i.e., the nacelle parameters are generally symmetric about the intermediate plane. However, such a symmetric configuration may reduce aerodynamic performance of conventional nacelles.

The nacelle parameters at azimuthal positions of a nacelle may determine aerodynamic performance of the nacelle. Azimuthal variation of the nacelle parameters may be required in order to introduce a left-right asymmetry to account for the aerodynamic non uniformities. Further, azimuthal variation of the nacelle parameters may reduce aerodynamic interaction between a nacelle, a wing and a fuselage of an aircraft due to size and design of the nacelle. Furthermore, azimuthal variation of the nacelle parameters may also mitigate aerodynamic interaction due to close-coupling of a gas turbine engine including the nacelle to a wing of an aircraft.

Figure 2:
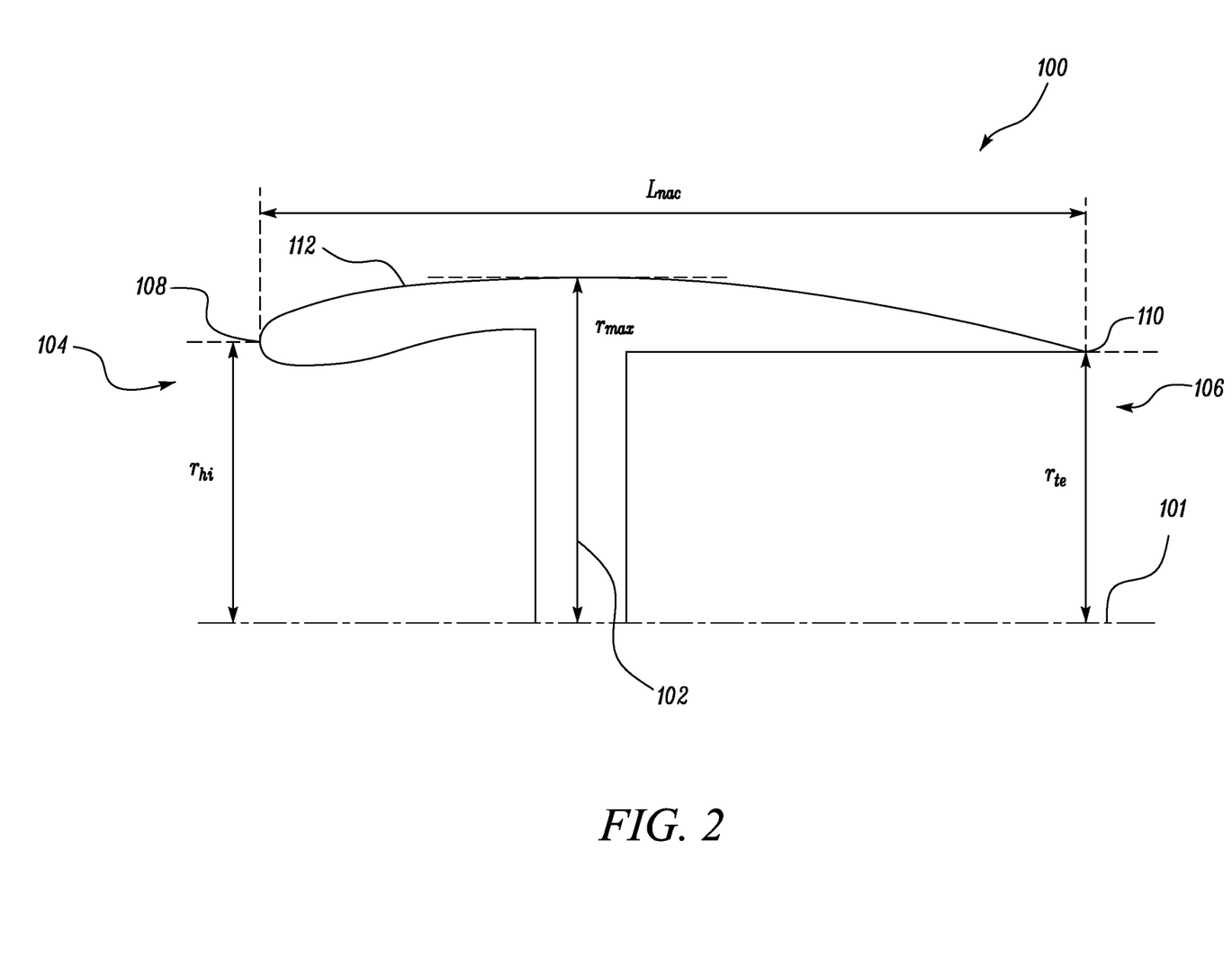
FIG. 2 is a schematic side sectional view of a top half of a nacelle illustrating various parameters.

FIG. 2 illustrates a top half of a nacelle 100. The nacelle 100 depicted in FIG. 2 has been simplified for representing various nacelle parameters. The nacelle 100 includes a leading edge 108 at an upstream end 104 of the nacelle 100. The nacelle 100 further includes a trailing edge 110 at a downstream end 106 of the nacelle 100. The nacelle 100 for the gas turbine engine 10 (shown in FIG. 1) having the longitudinal centre line 101 includes an outer surface 112 disposed between the leading edge 108 and the trailing edge 110. The term radius of the nacelle is used herein to denote the distance between the outer surface 112 of the nacelle 100 and the longitudinal centre line 101 when measured normal to the longitudinal centre line at any point along the longitudinal centre line. The nacelle 100 further includes a nacelle length $L_{nac}$ defined as an axial distance between the leading edge 108 and the trailing edge 110. The nacelle length $L_{nac}$ may be defined along the longitudinal centre line 101 of the gas turbine engine 10.

The radius of the nacelle 100 varies along the length of the nacelle. The nacelle 100 further includes an intermediate plane 102 defined between the leading edge 108 and the trailing edge 110. The intermediate plane 102 is substantially normal to the longitudinal centre line 101. The intermediate plane 102 includes a maximum radius $r_{max}$ of the outer surface 112 of the nacelle 100 with respect to the longitudinal centre line 101. Further, a highlight radius $r_{hi}$ is defined at the leading edge 108 of the nacelle 100. In other words, the leading edge 108 defines the highlight radius $r_{hi}$ about the longitudinal centre line 101. Further, the trailing edge 110 defines a trailing edge radius $r_{te}$ about the longitudinal centre line 101. As can be seen in FIG. 2, the maximum radius $r_{max}$ is greater than the highlight radius $r_{hi}$ and the trailing edge radius $r_{te}$.

The nacelle 100 further includes a fan casing 114 (shown in FIG. 3) disposed downstream of the leading edge 108. The fan casing 114 may receive the fan 12 of the gas turbine engine 10 (shown in FIG. 1). In some embodiments, the intermediate plane 102 axially bisects the fan casing 114. In some embodiments, the maximum radius $r_{max}$ of the outer surface 112 of the nacelle 100 may be at the fan casing 114. In some embodiments, the maximum radius $r_{max}$ of the outer surface 112 of the nacelle 100 may be along the intermediate plane 102 of the nacelle 100.

The nacelle 100 may be formed using any suitable material. For example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material.

Figure 3:
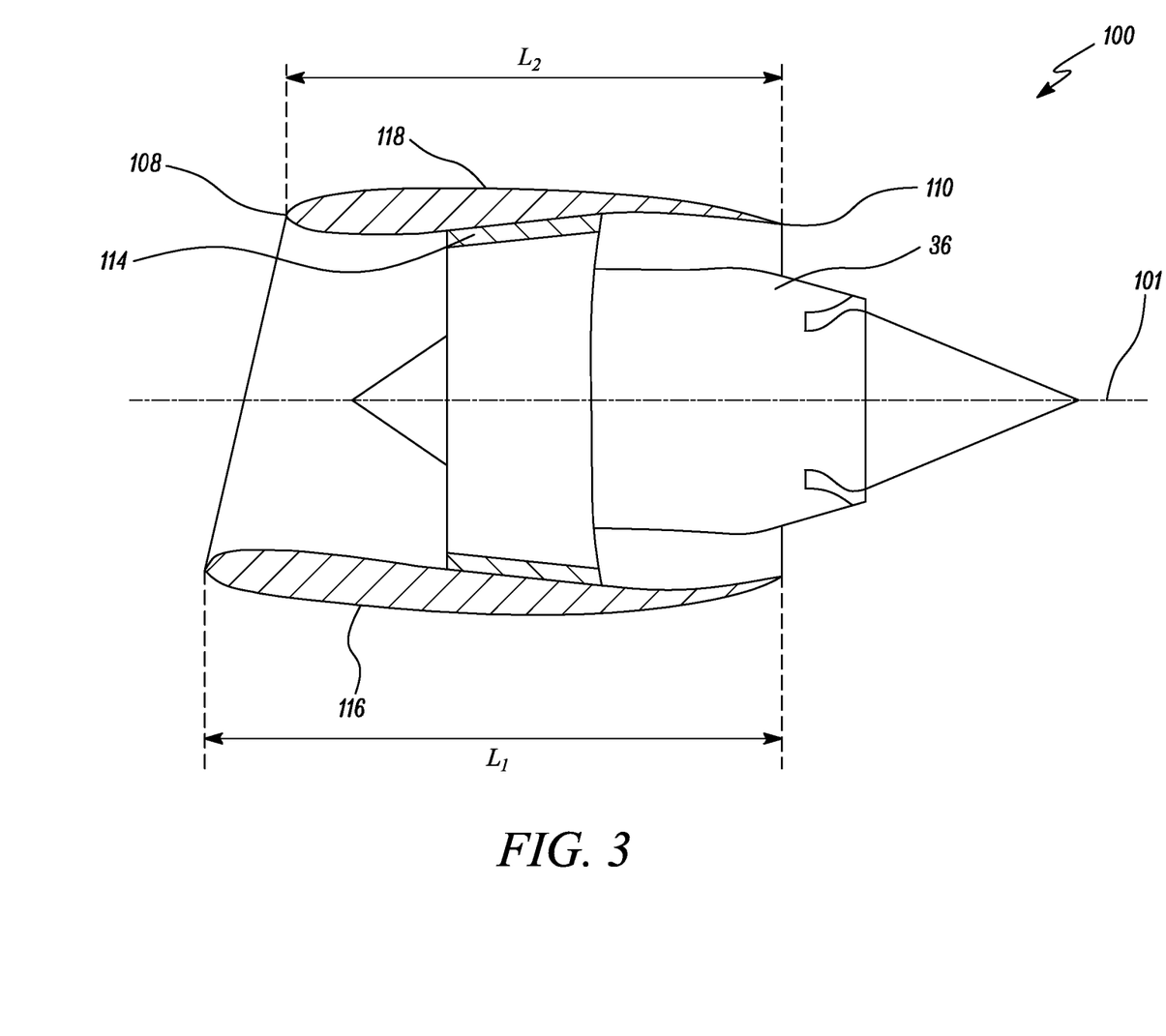
FIG. 3 is a schematic top sectional view of the nacelle according to an embodiment of the present disclosure.

FIG. 3 illustrates a top sectional view of the nacelle 100 in accordance to an embodiment of the present disclosure. Referring to FIGS. 2 and 3, the nacelle 100 is asymmetric about the intermediate plane 102. In other words, the nacelle 100 has a left-right asymmetry. As shown in FIG. 1, the longitudinal centre line 101 coincides with the principal rotational axis X-X' of the gas turbine engine 10. The longitudinal centre line 101 is also illustrated in FIG. 3. Furthermore, the nacelle 100 may optionally be scarfed and/or drooped.

The nacelle 100 includes an inboard end 116 and an outboard end 118 azimuthally opposite to the inboard end 116. The nacelle length $L_{nac}$ varies azimuthally as a function of an azimuthal angle defined about the longitudinal centre line 101. The nacelle length $L_{nac}$ has a maximum value $L_1$ at the inboard end 116 of the nacelle 100. Further, the nacelle length $L_{nac}$ has a minimum value $L_2$ at the outboard end 118 of the nacelle 100.

Figure 4:
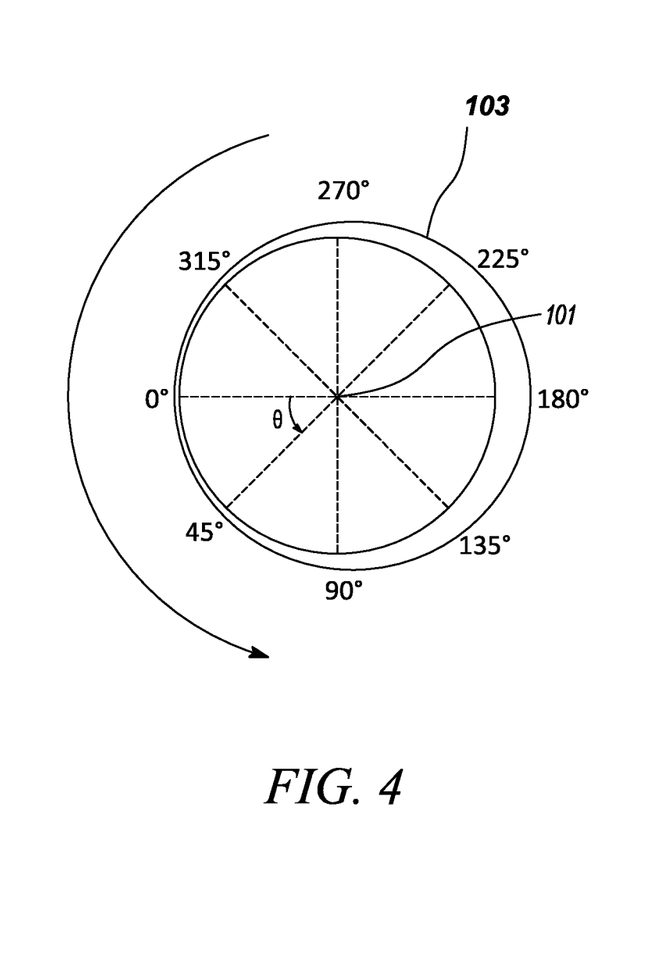
FIG. 4 is a plot illustrating azimuthal variation of a nacelle radius according to an embodiment of the present disclosure.

FIG. 4 shows an azimuthal angle θ ranging from 0 degree to 360 degrees. The azimuthal angle θ is defined about the longitudinal centre line 101 of the gas turbine engine 10 (shown in FIG. 1). The azimuthal angle θ ranges from 0 degree to 360 degrees in a counter-clockwise direction. The azimuthal angle of 0 degree is coincident with the azimuthal angle of 360 degrees.

The inboard end 116 of the nacelle 100 may be defined as an end proximate a fuselage when the nacelle 100 is attached to an aircraft. The inboard end 116 of the nacelle 100 may be located at the azimuthal angle of approximately 180 degrees. In some embodiments, the inboard end 116 of the nacelle 100 may be located at the azimuthal angle of about 170 degrees to about 190 degrees. Furthermore, the outboard end 118 may be defined as an end that is azimuthally opposite to the inboard end 116. The outboard end 118 of the nacelle 100 may be located at the azimuthal angle of approximately 0 degree or 360 degrees. In some embodiments, the outboard end 118 of the nacelle 100 may be located at the azimuthal angle of about 350 degrees to about 10 degrees.

Referring to FIGS. 2, 3 and 4, the nacelle length $L_{nac}$ varies azimuthally. The nacelle length $L_{nac}$ may vary as a function of the azimuthal angle θ. The function of the azimuthal angle θ that defines the nacelle length $L_{nac}$ may change as per application requirements. In some embodiments, the nacelle length $L_{nac}$ may be a linear function of the azimuthal angle θ. In some embodiments, the nacelle length $L_{nac}$ may be a non-linear function of the azimuthal angle θ.

The nacelle radius may also vary azimuthally. The nacelle radius may vary as a function of the azimuthal angle θ. The outer circle 103 shows an exemplary nacelle radius profile for a cross-section of the nacelle normal to the longitudinal centre line 101. In this example, it can be seen that the distance between the longitudinal centre line 101 and the radius outer surface (equal to the nacelle radius) is greater at 180 degrees than it is at 0 degrees, and varies with azimuthal angle. In this example, if the cross-section were taken at the intermediate plane 102, the radius at 180 degrees would be the maximum radius $r_{max}$ of the outer surface 112 of the nacelle 100.

Figure 5:
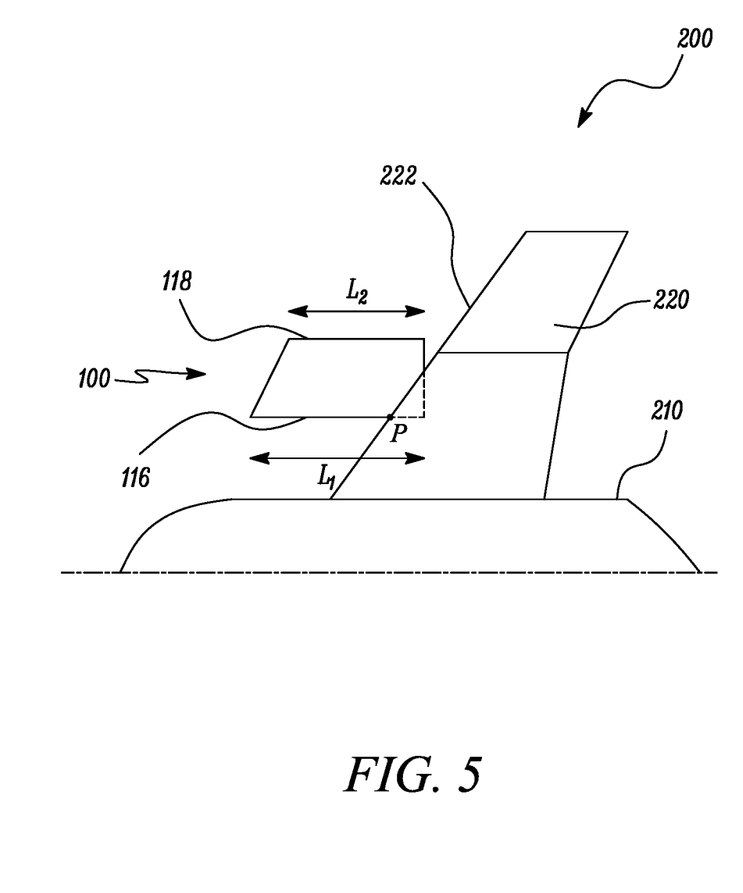
FIG. 5 is a schematic top view of an aircraft with the nacelle attached to a wing.

FIG. 5 illustrates a schematic top view of an aircraft 200 including the nacelle 100. In the illustrated embodiment of FIG. 5, the nacelle 100 is in an under-podded configuration. The aircraft 200 includes a fuselage 210 and at least one wing 220 extending from the fuselage 210. The aircraft 200 further includes the nacelle 100 attached to the at least one wing 220 extending from the fuselage 210. As shown in FIG. 5, the inboard end 116 of the nacelle 100 is proximate the fuselage 210. In terms of the azimuthal angle θ, the inboard end 116 of the nacelle 100 is at the azimuthal angle of approximately 180 degrees. The outboard end 118 of the nacelle 100 is azimuthally opposite to the inboard end 116. In terms of the azimuthal angle θ, the outboard end 118 of the nacelle 100 is at the azimuthal angle of approximately 0 degree. As discussed above, the nacelle length $L_{nac}$ varies azimuthally as the function of the azimuthal angle θ. Consequently, the nacelle 100 includes the maximum value $L_1$ of the nacelle length $L_{nac}$ and the minimum value $L_2$ of the nacelle length $L_{nac}$. The maximum value $L_1$ and the minimum value $L_2$ of the nacelle length $L_{nac}$ may also change as per application requirements. Further, a ratio between the maximum value $L_1$ and the minimum value $L_2$ may vary as per application requirements. Furthermore, a point at which the inboard end 116 intersects an upstream edge 222 of the wing 220 of the aircraft 200 is defined as a nacelle and wing intersection point P.

In the illustrated embodiment, the nacelle length $L_{nac}$ varies approximately linearly with the azimuthal angle θ. In other words, the nacelle length $L_{nac}$ is generally a linear function of the azimuthal angle θ. However, the present disclosure is not limited by any particular variation of the nacelle length $L_{nac}$ with the azimuthal angle θ. Referring to FIGS. 2-5, the nacelle length $L_{nac}$ increases azimuthally from the azimuthal angle of about 0 degree to the azimuthal angle of about 180 degrees. Further, the nacelle length $L_{nac}$ increases in a generally linear manner. Specifically, the nacelle length $L_{nac}$ increases azimuthally from the outboard end 118 to the inboard end 116 in a generally linear manner. Accordingly, the nacelle length $L_{nac}$ may have the maximum value $L_1$ at the azimuthal angle of approximately 180 degrees. In other words, the nacelle length $L_{nac}$ has the maximum value $L_1$ at the inboard end 116 of the nacelle 100.

Further, the nacelle length $L_{nac}$ decreases azimuthally from the azimuthal angle of about 180 degrees to the azimuthal angle of about 360 degrees. Further, the nacelle length $L_{nac}$ decreases in a generally linear manner. Specifically, the nacelle length $L_{nac}$ decreases azimuthally from the inboard end 116 of the nacelle 100 to the outboard end 118 of the nacelle 100 in a generally linear manner. Accordingly, the nacelle length $L_{nac}$ may have the minimum value $L_2$ at the azimuthal angle of about 0 degree or about 360 degrees. In other words, the nacelle length $L_{nac}$ has the minimum value $L_2$ at the outboard end 118 of the nacelle 100.

In some embodiments, a ratio of the nacelle length $L_{nac}$ to the highlight radius $r_{hi}$ is greater than 2.4 and less than 3.6. For example, a ratio between the minimum value $L_2$ of the nacelle length $L_{nac}$ to the highlight radius $r_{hi}$ is in a range from about 2.4 to about 3.6. A nacelle designed according to this ratio may be suitable for an ultra-high bypass ratio (UHBPR) engine. In some other embodiments, the ratio of the nacelle length $L_{nac}$ to the highlight radius $r_{hi}$ may be greater than 1 and less than 2.4. In some other embodiments, the ratio of the nacelle length $L_{nac}$ to the highlight radius $r_{hi}$ may be greater than 3.6.

Compact nacelles of ultra-high bypass ratio (UHBPR) engines may incur larger accelerations at their inboard end with strong shockwaves. A nacelle length of compact nacelles may be varied azimuthally to extend the nacelle length at their inboard end. A nacelle with an extended inboard end length may reduce an isentropic Mach number at a nacelle and wing intersection point, thereby reducing an aerodynamic interaction between the nacelle and a wing. A reduction in the isentropic Mach number at the nacelle and wing intersection point may reduce drag and thereby reduce fuel consumption during operation of an aircraft.

Therefore, the nacelle 100 including the azimuthal variation of the nacelle length $L_{nac}$ may result in reduced aerodynamic interaction between the nacelle 100 and the wing 220 due to a decrease in the isentropic Mach number at the nacelle and wing intersection point P. A reduction in the isentropic Mach number $M_N$ at the nacelle and wing intersection point P may reduce drag and thereby reduce fuel consumption during operation of the aircraft 200.

Figure 6:
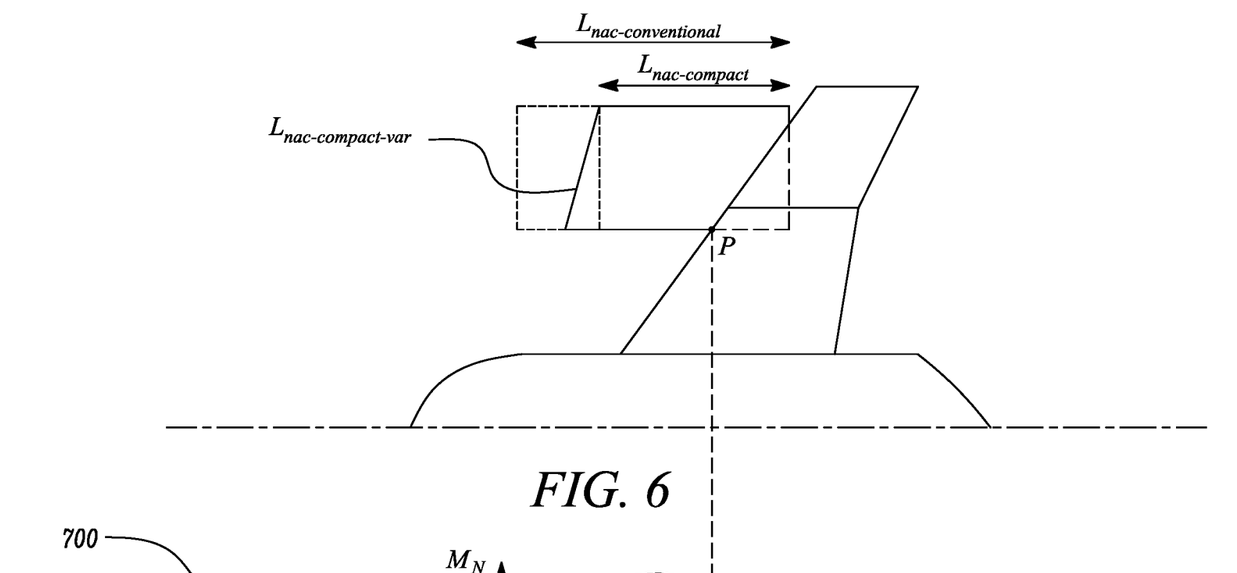
FIG. 6 is a schematic top view of an aircraft illustrating various nacelle configurations.

FIG. 6 illustrates different nacelle configurations. A conventional long nacelle is generally symmetric and may have a relatively long and uniform nacelle length $L_{nac\text{-}conventional}$. A compact nacelle is also generally symmetric and may have a relatively shorter and uniform nacelle length $L_{nac\text{-}compact}$ as compared to the conventional long nacelle. Lengths of the conventional long nacelle and the compact nacelle are generally constant azimuthally. A compact nacelle with a variable nacelle length $L_{nac\text{-}compact\text{-}var}$, according to an embodiment of the present disclosure, is also shown in FIG. 6. The compact nacelle with the variable nacelle length $L_{nac\text{-}compact\text{-}var}$ may have a length reduction of the order of 20% as compared to the conventional long nacelle.

Figure 7:
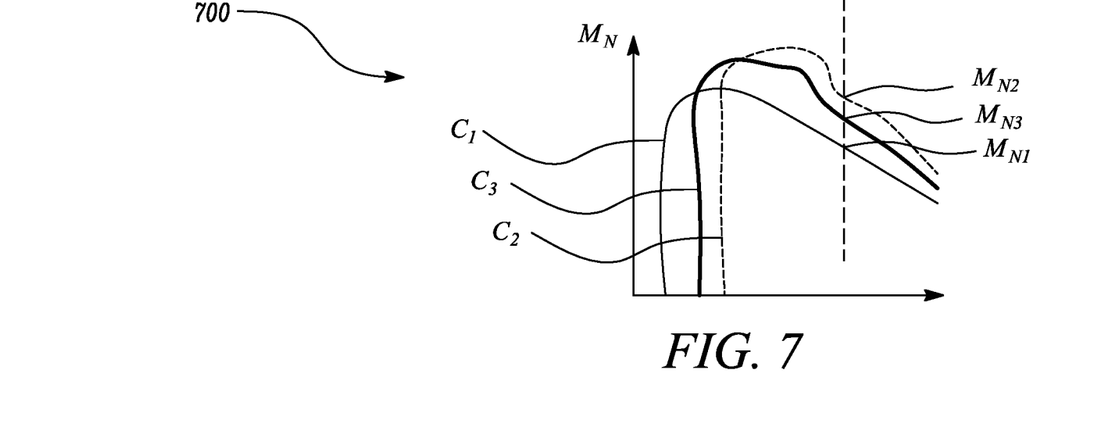
FIG. 7 is a graph illustrating a variation of isentropic Mach number along an inboard end for various nacelle configurations of FIG. 6.

FIG. 7 illustrates a variation of the isentropic Mach number $M_N$ along the inboard end of the different nacelle configurations shown in FIG. 6. Referring to FIGS. 6 and 7, a graph 700 corresponds to the distribution of the isentropic Mach number $M_N$ along a length of the inboard end of the different nacelle configurations. The graph 700 corresponds to the conventional long nacelle, the compact nacelle and the compact nacelle with the variable nacelle length $L_{nac\text{-}compact\text{-}var}$ in accordance with the present disclosure. The isentropic Mach number $M_N$ is shown along the abscissa (Y-axis) and the corresponding length of the inboard end is shown along the ordinate (X-axis). The associated arrows give, as is usual in graphs, the directions for values of increasing magnitude in the graph.

A curve $C_1$ shows the isentropic Mach number distribution along the inboard end of the conventional long nacelle with the azimuthally uniform long nacelle length $L_{nac\text{-}conventional}$. The curve $C_1$ may have a relatively low isentropic Mach number $M_{N1}$ at the nacelle and wing intersection point P. However, such conventional long nacelles may not be suitable for ultra-high bypass ratio (UHBPR) engines due to dimensional constraints.

A curve $C_2$ shows the isentropic Mach number distribution along the inboard end of the compact nacelle with the azimuthally uniform compact nacelle length $L_{nac\text{-}compact}$. The curve $C_2$ may have a relatively high isentropic Mach number $M_{N2}$ at the nacelle and wing intersection point P.

Such compact nacelles with short length may be suitable for ultra-high bypass ratio (UHBPR) engines. However, due to high aerodynamic interaction at the nacelle and wing intersection point P, there may be a penalty with regards to fuel consumption during operation of an aircraft that the compact nacelle is attached to.

The compact nacelle, according to the present disclosure, includes the variable nacelle length $L_{nac\text{-}compact\text{-}var}$, which has a maximum value of the variable length at the inboard end. The variable nacelle length decreases azimuthally from the inboard end to the outboard end. A curve $C_3$ shows the isentropic Mach number distribution along the inboard end of the compact nacelle with variable nacelle length. The compact nacelle with variable nacelle length may have a reduced isentropic Mach number $M_{N3}$ at the nacelle and wing intersection point P compared to the compact nacelle. The compact nacelle with variable nacelle length may also be suitable for ultra-high bypass ratio (UHBPR) engines.

As shown in the graph 700, $M_{N2} > M_{N3} > M_{N1}$. Hence, the compact nacelle with variable length may experience benign flow features, e.g., weaker shock-waves, and a lower isentropic Mach number $M_N$ at the nacelle and wing intersection point P, compared to the compact nacelle while being suitable for an ultra-high bypass ratio (UHBPR) engine. This may result in a reduction in aerodynamic interaction between the nacelle and the wing, thereby optimising the fuel consumption during operation of an aircraft the nacelle with variable length is attached to.

Referring to FIG. 2, in some embodiments, the radius of the outer surface 112 in the intermediate plane 102 varies azimuthally as a function of the azimuthal angle θ. In other words, the radius of the outer surface 112 in the intermediate plane 102 does not have to equal $r_{max}$ for the entire circumference of the nacelle in the intermediate plane. The radius may vary azimuthally in any suitable manner as per application requirements.

In some embodiments, the trailing edge radius $r_{te}$, the highlight radius $r_{hi}$, and the radius at the intermediate plane 102 may vary azimuthally as a same function of the azimuthal angle θ. In some embodiments, the highlight radius $r_{hi}$, the trailing edge radius $r_{te}$ and the radius at the intermediate plane 102 may vary azimuthally as different functions of the azimuthal angle θ.

The nacelle 100 conforming to such variations may result in a configuration in which the outer surface 112 of the nacelle 100 is closest to the fuselage 210 at its inboard end. In other words, the nacelle 100 conforming to such variations may result in a configuration in which the outer surface 112 of the nacelle 100 is closest to the fuselage 210 at the azimuthal angle of about 180 degrees. Such a configuration may reduce the nacelle to fuselage distance. Due to a reduction of the nacelle to fuselage distance, aerodynamic interaction between the nacelle 100 and the fuselage 210 may be reduced. Consequently, the aerodynamic performance of the nacelle 100 may be optimised and subsequently overall aircraft performance may be improved. This may further reduce fuel consumption during operation of the aircraft 200.

In some embodiments, the nacelle 100 conforming to such variations may also result in a reduction in a gully length (not shown) which is a minimum distance between the wing 220 and the nacelle 100. The gully length may have a first order impact on the aerodynamic interaction between a nacelle and a wing for a close-coupled ultra-high bypass ratio (UHBPR) engine. The reduction in the gully length may further optimise the aerodynamic performance of the nacelle 100, and subsequently improve overall aircraft performance and reduce fuel consumption during operation of the aircraft 200.

In some embodiments, the nacelle parameters such as maximum radius $r_{max}$, the highlight radius $r_{hi}$, the trailing edge radius $r_{te}$ and the nacelle length $L_{nac}$ may all be varied independent of each other as different functions of the azimuthal angle θ to define a nacelle geometry suitable as per application requirements.

In some embodiments, the gas turbine engine 10 includes the nacelle 100. The gas turbine engine 10 further includes the fan 12 received within the nacelle 100. The gas turbine engine 10 further includes the engine core 36 received within the nacelle 100. In some embodiments, the aircraft 200 includes the gas turbine engine 10 including the nacelle 100.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a housing a fan within a gas turbine engine, the nacelle having a longitudinal centre line and comprising:
   a leading edge and a trailing edge; and
   a nacelle length ($L_{nac}$) defined as an axial distance between the leading edge and the trailing edge;
   wherein an azimuthal angle (θ) is defined about the longitudinal centre line, and wherein the nacelle length ($L_{nac}$) varies azimuthally; and
   wherein the nacelle length ($L_{nac}$) decreases azimuthally from an inboard end of the nacelle to an outboard end of the nacelle.

2. The nacelle of claim 1, wherein the nacelle length ($L_{nac}$) varies as a function of the azimuthal angle (θ).

3. The nacelle of claim 2, wherein the nacelle length ($L_{nac}$) has a maximum value ($L_1$) at the inboard end of the nacelle.

4. The nacelle of claim 2, wherein the nacelle length ($L_{nac}$) has a minimum value ($L_2$) at the outboard end of the nacelle.

5. The nacelle of claim 1, further comprising:
   an intermediate plane defined between the leading edge and the trailing edge, wherein the intermediate plane is substantially normal to the longitudinal centre line and includes a maximum radius ($r_{max}$) of an outer surface of the nacelle with respect to the longitudinal centre line; and
   wherein the radius of the outer surface in the intermediate plane varies azimuthally.

6. The nacelle of claim 5, wherein the radius of the outer surface in the intermediate plane varies azimuthally as a function of the azimuthal angle (θ).

7. The nacelle of claim 5, further comprising a fan casing disposed downstream of the leading edge, wherein the intermediate plane axially bisects the fan casing.

8. The nacelle of claim 1, wherein a highlight radius ($r_{hi}$) is defined at the leading edge of the nacelle, and wherein a ratio of the nacelle length ($L_{nac}$) to the highlight radius ($r_{hi}$) is greater than 2.4 and less than 3.6.

9. A gas turbine engine for an aircraft, the gas turbine engine comprising:
   the nacelle of claim 1;
   a fan received within the nacelle; and
   an engine core received within the nacelle.

10. An aircraft comprising the gas turbine engine of claim 9, the aircraft further comprising:
   a fuselage; and
   at least one wing extending from the fuselage;
   wherein the nacelle is attached to the at least one wing.

* * * * *